United States Patent
Lee et al.

(10) Patent No.: US 8,472,290 B2
(45) Date of Patent: Jun. 25, 2013

(54) APPARATUS AND METHOD IDENTIFYING DISC TYPE

(75) Inventors: Young-woo Lee, Gyeonggi-do (KR); Sang-whook Kim, Gangwon-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2263 days.

(21) Appl. No.: 10/603,813

(22) Filed: Jun. 26, 2003

(65) Prior Publication Data

US 2004/0090883 A1    May 13, 2004

(30) Foreign Application Priority Data

Nov. 12, 2002 (KR) .................. 2002-70061

(51) Int. Cl.
    *G11B 7/00*      (2006.01)

(52) U.S. Cl.
    USPC ........... 369/44.29; 369/44.27; 369/44.26; 369/53.2; 369/53.23

(58) Field of Classification Search
    None
    See application file for complete search history.

(56) References Cited

U.S. PATENT DOCUMENTS 6,144,625 A * 11/2000 Kuroda et al. ............. 369/53.23

FOREIGN PATENT DOCUMENTS

| JP | 2002-133656 | 5/2002 |
| KR | 2001-84663 | 9/2001 |
| KR | 2001-85500 | 9/2001 |

OTHER PUBLICATIONS

Notice of Office Action issued by the Korean Patent Office on Apr. 8, 2005 in Korean Application No. 10-2002-0070061.

* cited by examiner

*Primary Examiner* — Muhammad N Edun
(74) *Attorney, Agent, or Firm* — Staas & Halsey LLP

(57) ABSTRACT

A method and apparatus identifying a type of a recordable disc according to whether a land pre-pit (LPP) is formed on the disc. The apparatus includes an RF (radio frequency) amplifier amplifying light reflected by the disc to a predetermined value; an LPP signal detector detecting an LPP (Land Pre-Pit) signal from output signals of the RF amplifier; and a system controller identifying a type of the disc according to whether the LPP signal is detected by the LPP signal detector. Since a disc type is discriminated and operational conditions of a disc drive are adequately set during an early stage of a disc driving period, a lead-in time of a disc can be reduced.

7 Claims, 3 Drawing Sheets

APPARATUS AND METHOD IDENTIFYING DISC TYPE

CROSS-REFERENCE TO RELATED APPLICATIONS

This application claims the priority of Korean Patent Application No. 2002-70061, filed on Nov. 12, 2002, in the Korean Intellectual Property Office, the disclosure of which is incorporated herein in its entirety by reference.

BACKGROUND OF THE INVENTION

1. Field of the Invention

The present invention relates to an apparatus and method identifying a disc type in a disc drive, and more particularly, to an apparatus and method of identifying a type of a disc using an LPP (Land Pre-Pit) formed on the disc.

2. Description of the Related Art

There are various types of recordable discs, such as a recordable CD (compact disc) and a recordable DVD (digital versatile disc). The recordable DVDs can be divided into DVD−R/+R type discs, i.e., one-time recordable discs, and DVD−RW/DVD+RW type discs, i.e., re-recordable discs on which data can be recorded several times.

Although the shapes of the above-mentioned discs are the same regardless of the types of the discs, their physical disc formats are different according to the types of the discs. That is, the recordable discs use periodic wobble grooves and utilize them to produce clock signals in a recording mode. The reason for wobbling the grooves is that the recordable discs cannot produce clock signals from reproduction signals. Accordingly, in the case of the recordable discs, tracking and rotation speed of the disc are controlled using wobble signals in a recording mode.

The recordable discs have different wobble frequencies and amplitudes according to the types of the discs. Further, methods of forming wobble grooves are different according to the types of recordable discs. Particularly, in the case of DVD−R/−RW type discs, position information of a groove track is recorded by forming a pre-pit in a land track on which data is not recorded. The pre-pit formed in the land track is called LPP (Land Pre-Pit). The LPP is recordable in wobble shapes, and used to store an absolute address of the portion where data is not recorded, i.e., a block address number, and other information. However, in case of DVD+R/+RW type discs, the wobble is formed in a phase modulation method.

In order to drive various types of discs having different physical formats in the same disc drive, the disc drive must be able to set operational conditions adequate to the physical format of a disc to be driven during a lead-in time period for the disc. The setting of the operational conditions is for normally reading data from or writing data to the disc. Setting a servo gain to stabilize servo operations is an example of setting the operational conditions of the disc drive. In order to set the operational conditions, the type of the disc to be driven must be correctly identified.

In a conventional method of identifying a type of a disc, the disc type is identified on the basis of an ID (identification) code recorded in a lead-in area of the disc. That is, after the operational conditions of a disc drive are set to read the ID code, the disc type is identified using the ID code recorded in the lead-in area and the currently set operational conditions are adequate for the identified disc type, the lead-in operation for the disc is over.

However, if the operational conditions of the disc drive are not adequate for the identified disc type, the disc drive must retry the setting of the operational conditions adequately for the identified disc type. Accordingly, in the case where the operational conditions of the disc drive are not adequate for the identified disc type, the lead-in operation is inefficiently performed.

SUMMARY OF THE INVENTION

The present invention provides an apparatus and method of identifying a type of a disc based on a shape of a wobble formed on the disc.

Further, the present invention provides an apparatus and method of identifying a type of a disc based on whether there exists an LPP on the disc.

Further, the present invention provides an apparatus and method of identifying between a DVD(−) type disc and a DVD(+) type disc based on whether an LPP is found on the disc.

According to an aspect of the present invention, an apparatus identifying a type of a disc includes an RF (radio frequency) amplifier amplifying light reflected by the disc to a predetermined value; an LPP signal detector detecting an LPP (Land Pre-Pit) signal from output signals of the RF amplifier; and a system controller identifying a type of the disc according to whether the LPP signal is detected by the LPP signal detector.

The LPP signal detector detects the LPP signal by slicing push-pull signals output from the RF amplifier at a constant level.

The system controller determines that the disc is a DVD(−) type disc when the LPP signal is detected and that the disc is a DVD(+) type disc when the LPP signal is not detected.

According to another aspect of the present invention, a method of identifying a type of a disc includes detecting an LPP (Land Pre-Pit) signal from the signals reproduced from the disc using light reflected by the disc and identifying a type of the disc according to whether the LPP signal is detected.

The detection of the LPP signal includes detecting the LPP signal by slicing push-pull signals corresponding to the amount of light reflected by the disc at a constant level.

The identification of the type of the disc includes determining that the disc is a DVD(−) type disc when the LPP signal is detected and that the disc is a DVD(+) type disc when the LPP signal is not detected.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing embodiments thereof with reference to the attached drawings in which.

DETAILED DESCRIPTION OF THE INVENTION

Figure 1:
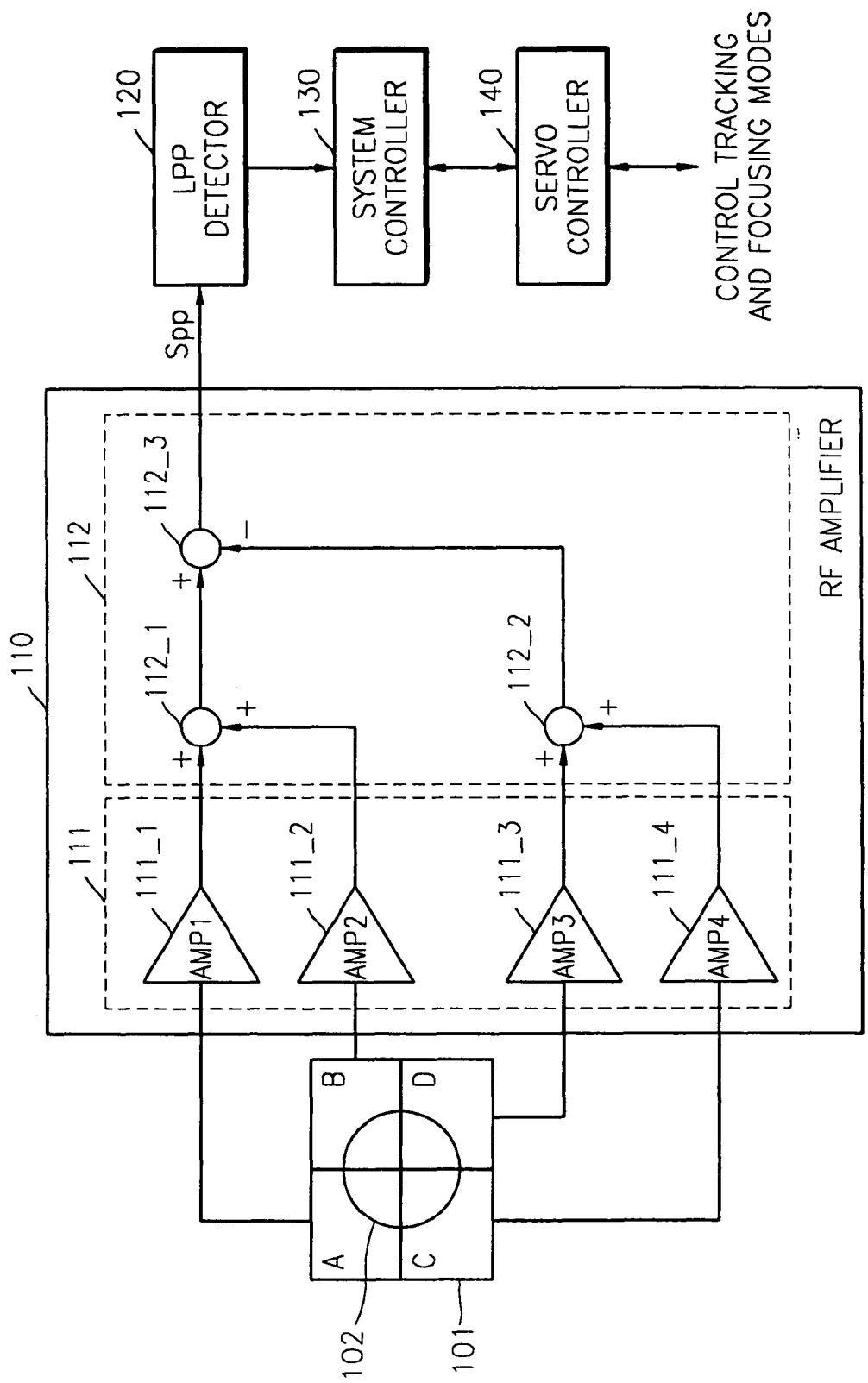
FIG. 1 is a block diagram of a disc drive including an apparatus identifying a type of a disc according to an embodiment of the present invention.

Embodiments of the present invention will now be described in detail with reference to the attached drawings, in which like reference numerals indicate like elements.

FIG. 1 is a block diagram of a disc drive including an apparatus identifying a type of a disc according to an embodiment of the present invention. Referring to FIG. 1, the disc drive includes an optical detector 101, an RF (radio frequency) amplifier 110, an LPP (Land Pre-Pit) detector 120, a system controller 130, and a servo controller 140.

The optical detector 101 is incorporated into a pickup (not shown) of the disc drive. The optical detector 101 detects light reflected by a disc (not shown). The optical detector 101 shown in FIG. 1 has a structure divided into four sections. However, another optical detector having a different structure can be used as the optical detector 101. For example, an optical detector having a bi-sectional structure can be used as the optical detector 101. Reference number 102 in FIG. 1 refers to a spot. The spot 102 is formed by light reflected by the disc (not shown). The optical detector 101 shown in FIG. 1 is comprised of four photodiodes A, B, C, and D.

The RF amplifier 110 includes a current-to-voltage converter 111 and a push-pull operator 112. Since the optical detector 101 has a four-sectional structure, the current-to-voltage converter 111 is comprised of four amplifiers 111_1 through 111_4. The amplifiers 111_1 through 111_4 convert output signals from corresponding photodiodes of the optical detector 101 to voltage values. That is, electrical signals output from photodiode A are converted to voltage values through the amplifier 111_1. Electrical signals output from photodiode B are converted to voltage values through the amplifier 111_2. Electrical signals output from photodiode C are converted to voltage values through the amplifier 111_3. Electrical signals output from photodiode D are converted to voltage values through the amplifier 111_4.

The push-pull operator 112 includes adders 112_1 and 112_2 and a subtracter 112_3. The adder 112_1 adds output signals of the amplifiers 111_1 and 111_2. The adder 112_2 adds output signals of the amplifiers 111_3 and 111_4. The subtracter 112_3 adds an output signal of the adder 112_1 and an output signal of the adder 112_2. Through the calculating operations described above, a push-pull signal Spp corresponding to light output from the optical detector 101 is obtained.

Figure 2:
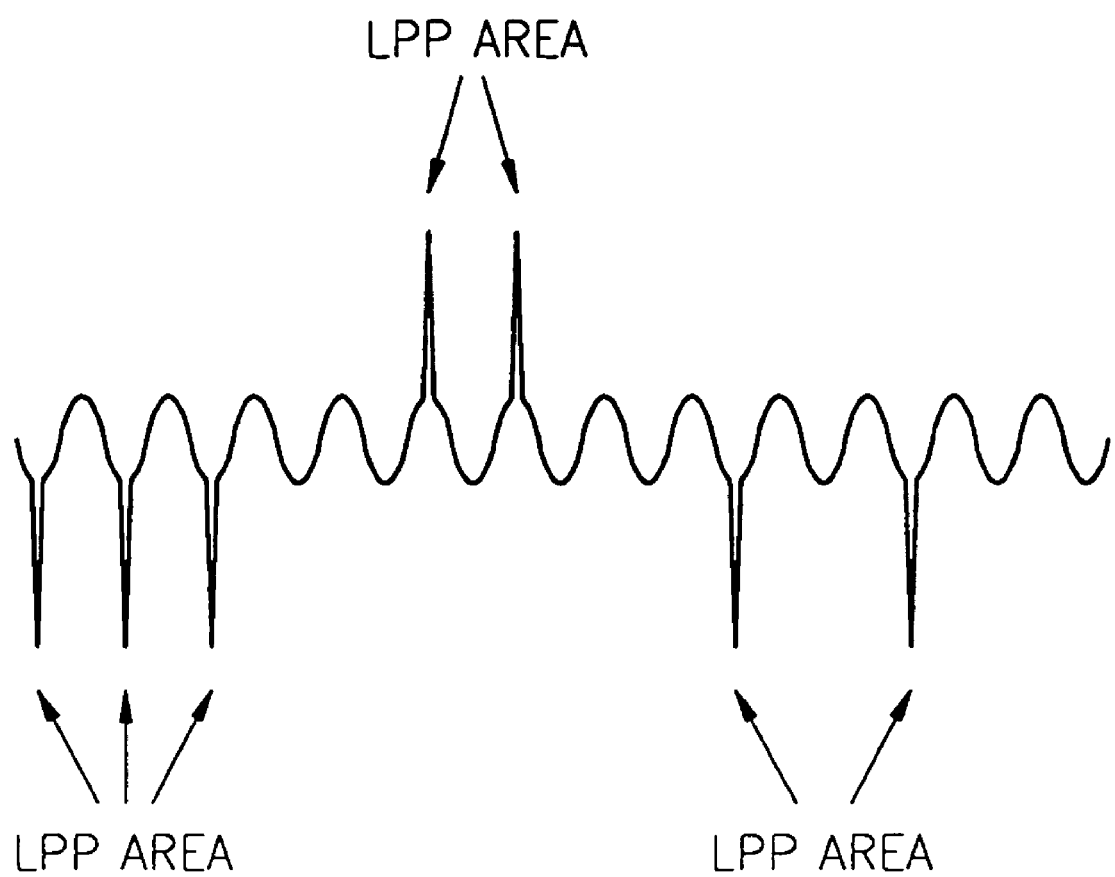
FIG. 2 shows an example of waveforms of wobble signals including LPP signals.

The LPP detector 120 detects an LPP signal by slicing the push-pull signal output from the RF amplifier 110 at a constant level. Since the push-pull signal in an LPP area is ordinarily produced as signals having an up and down impulse format as shown in FIG. 2, if the push-pull signal is sliced at a constant level, only the required LPP can be obtained. Then, the result of the detection by the LPP detector 120 is provided to the system controller 130.

FIG. 2 shows an example of waveforms of wobble signals including LPP signals. The reason the signals have an up/down impulse format in LPP areas is that the land area, in which the pre-pit is formed, is a non-recordable area and, accordingly, the reflectivity therein is high.

The system controller 130 controls the disc drive to enable tracking and focusing modes via the servo controller 140 and, then, identifies a disc type based on the LPP detection result transmitted from the LPP detector 120. That is, the system controller 130 analyzes an output signal of the LPP detector 120. If the LPP is detected, the output signal of the LPP detector 120 has a certain voltage level. Therefore, the system controller 130 analyzes the output signal of the LPP detector 120 by checking whether the output signal of the LPP detector 120 has a certain voltage level. If the output signal of the LPP detector 120 has a certain voltage level, the system controller 130 determines that the disc inserted into the disc drive is a DVD(−) type disc. The DVD(−) type disc includes DVD−RW and DVD−R discs.

However, if the output signal of the LPP detector 120 does not have a certain voltage level, the system controller 130 determines that the disc inserted into the disc drive is a DVD(+) type disc. The DVD(+) type disc includes DVD+RW and DVE+R discs.

The servo controller 140 controls the focusing and tracking modes in a conventional way under the control of the system controller 130.

Figure 3:
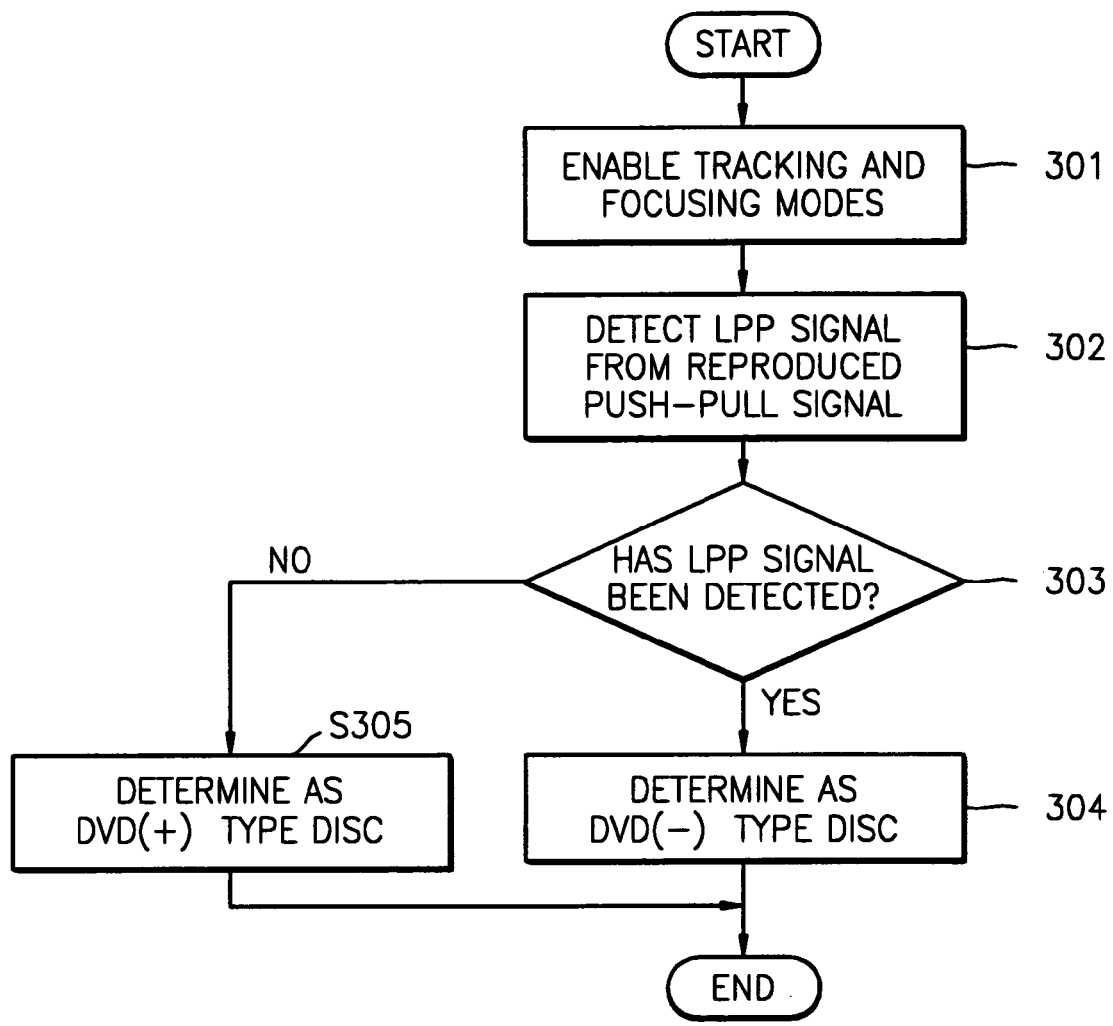
FIG. 3 is a flowchart of a method of identifying a type of a disc according to an embodiment of the present invention.

FIG. 3 is a flowchart of a method of identifying a type of a disc according to an embodiment of the present invention.

In OPERATION 301, the system controller 130 enables tracking and focusing modes of the disc drive. The focusing and tracking modes are controlled in a conventional way. In OPERATION 302, the system controller 130 detects LPP signals from the reproduced push-pull signals. The LPP signals are detected by slicing the reproduced push-pull signals at a constant level as described above with reference to FIG. 1.

In OPERATION 303, if the LPP signals are detected, the system controller 130 determines in OPERATION 304 that the disc inserted into the disc drive is a DVD(−) type disc. However, in OPERATION 303, if the LPP signals are not detected, the system controller 130 determines in OPERATION 305 that the disc inserted into the disc drive is a DVD(+) type disc.

As described above, according to the present invention, it is possible to identify a disc type based on whether an LPP signal is detected in the early stage of a disc driving period, i.e., immediately after controlling a tracking servo. Accordingly, operational conditions of a disc drive can be set in the early stage of the disc driving period and, thus, lead-in time of a disc can be reduced.

While the present invention has been particularly shown and described with reference to embodiments thereof, it will be understood by those of ordinary skill in the art that various changes in form and details may be made therein without departing from the spirit and scope of the present invention as defined by the appended claims.

What is claimed is:

1. An apparatus identifying a disc type, comprising:
   a servo controller that enables tracking and focusing;
   an RF amplifier that produces a push-pull signal from a light wave reproduced from a disc; and
   an LPP signal detector that detects a certain voltage level in the push-pull signal immediately after the servo controller enables tracking;
   wherein if the certain voltage level is detected the disc is identified as a DVD(−) type disc and if the certain voltage level is not detected the disc is identified as a DVD (+) type disc,
   the LPP detector detects an LPP signal according to detection of the certain voltage level by slicing the push-pull signal at a constant level,
   the DVD(−) type discs include DVD-RW and DVD-R discs, and
   the DVD(+) type discs include DVD+RW and DVD+R discs.

2. The apparatus of claim 1, wherein the LPP detector detects an LPP in the push-pull signal by detection of the certain voltage level.

3. The apparatus of claim 1, further comprising:
   a system controller that controls a disc drive and identifies the disc type.

4. The apparatus of claim 1, further comprising:
   an optical detector that detects the light wave reflected from the disc.

5. The apparatus of claim 4, wherein the optical detector comprises:
   a structure divided into four sections having a first photodiode, a second photodiode, a third photodiode, and a fourth photodiode.

6. The apparatus of claim 1, wherein the RF amplifier comprises:
   a current-to-voltage converter having a first amplifier, a second amplifier, a third amplifier, and a fourth amplifier, wherein the four amplifiers convert output signals from corresponding first through fourth photodiodes of the optical detector to voltage values; and
   a push-pull operator having a first adder, a second adder, and a subtracter, wherein the first adder adds output signals of the first amplifier and the second amplifier to produce a first added signal, the second adder adds output signals of the third amplifier and the fourth amplifier to produce a second added signal, and the subtracter adds the first added signal and the second added signal to produce the push-pull signal.

7. The apparatus of claim 1, further comprising:
   an optical detector having a bi-sectional structure that includes a first photodiode and a second photodiode.

* * * * *